United States Patent
Ruggiero et al.

(10) Patent No.: US 6,653,273 B2
(45) Date of Patent: Nov. 25, 2003

(54) WETTING AGENTS FOR CONCRETE CLEANING AND ADHESIVES

(75) Inventors: Murray A. Ruggiero, East Haven, CT (US); Bruce A. Marien, Woodbridge, CT (US); Shoaib Arif, Dublin, OH (US); Robert P. Roth, Cheshire, CT (US); Joseph T. Farrell, Brandenburg, KY (US); Arthur Ray Vanover, Brandenburg, KY (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 09/994,391

(22) Filed: Nov. 26, 2001

(65) Prior Publication Data

US 2002/0055448 A1 May 9, 2002

Related U.S. Application Data

(63) Continuation of application No. 08/435,260, filed on May 5, 1995, now abandoned, which is a division of application No. 08/324,954, filed on Oct. 18, 1994, now Pat. No. 5,656,683, which is a continuation-in-part of application No. 08/189,369, filed on Jan. 31, 1994, now Pat. No. 5,360,457.

(51) Int. Cl.[7] ............................. C11D 1/70; C11D 3/28; C11D 3/26; B08B 3/04
(52) U.S. Cl. ...................... 510/421; 510/365; 510/366; 510/426; 510/433; 510/499; 134/42
(58) Field of Search ................................. 510/245, 264, 510/274, 421, 426, 433, 499, 365, 366

(56) References Cited

U.S. PATENT DOCUMENTS

| | | | | |
|---|---|---|---|---|
| 4,306,990 A | * | 12/1981 | Goodman et al. | 252/174.15 |
| 4,925,587 A | * | 5/1990 | Schenker et al. | 252/174.22 |
| 5,196,146 A | * | 3/1993 | Farella et al. | 252/542 |
| 5,262,535 A | * | 11/1993 | Kaiser | 544/402 |
| 5,290,470 A | * | 3/1994 | Dutcher | 252/102 |
| 5,348,679 A | * | 9/1994 | Weinhold et al. | 252/105 |

* cited by examiner

*Primary Examiner*—Gregory Delcotto
(74) *Attorney, Agent, or Firm*—Dale Lynn Carlson; Wiggin & Dana LLP

(57) ABSTRACT

The present invention relates to a cleaning composition comprising: (a) at least one additive selected from the group consisting of detergents, corrosion inhibitors, organic and aqueous carriers, and combinations thereof, (b) a wetting/cleaning agent selected from the group consisting of piperazine-substituted organosulfonates, piperazinone-substituted organosulfonates, and combinations thereof, and (c) a surfactant selected from the group consisting of alcohol alkoxylates, organic and inorganic salts of polycarboxylated alcohol alkoxylates, and combinations thereof. Also disclosed is an adhesive composition containing the above wetting agent, as well as a method of cleaning a substrate and a method of enhancing adhesion to a substrate using the above wetting agent.

4 Claims, No Drawings

WETTING AGENTS FOR CONCRETE CLEANING AND ADHESIVES

CROSS REFERENCE TO RELATED APPLICATION

This patent application is a Continuation of, and claims priority to, U.S. patent application Ser. No. 08/435,260 which was filed on May 5, 1995, now abandoned, which in turn is a Divisional of U.S. patent application Ser. No. 08/324,954 which was filed on Oct. 18, 1994, now U.S. Pat. No. 5,656,683, which in turn is a Continuation-in-Part of U.S. patent application Ser. No. 08/189,369 which was filed on Jan. 31, 1994, now U.S. Pat. No. 5,360,457.

FIELD OF THE INVENTION

The present invention relates generally to adhesive compositions and cleaning compositions, and more specifically, to a wetting agent/surfactant that enhances the cleaning efficacy of metal and concrete cleaning compositions and the adhesion efficacy of adhesive compositions.

BACKGROUND OF THE INVENTION

Piperazine salts, such as the aminoethylpiperazine salt of diphenyl ether disulfonic acid, are known in the prior art. For example, U.S. Pat. No. 5,262,535 discloses that these salts are useful as cleaning agents for such articles as plastics and vinyl. Likewise, certain 2-piperazinones (which contain keto-substitution on the ring) are disclosed in compositions containing an alkali metal, alkaline earth metal, or ammonium salt of alkylated diphenyl oxide sulfonate as a surfactant, alone or in combination with a nonionic surfactant that may contain a mixture of ethoxylated and propoxylated alcohol, as taught in U.S. Pat. No. 5,196,146. The '146 patent teaches that the compositions disclosed therein are useful in cleaning grease and oil from metal, plastic, glass, and other surfaces. However, the present inventors have found that the 2-piperazinones disclosed in the '146 patent do not react, in accordance with the preparation process of that patent, with the diphenyl oxide sulfonate surfactant disclosed therein to provide the corresponding piperazinone salt of diphenyl ether disulfonic acid.

There is an need in the marketplace for additives that are useful in enhancing the bonding efficacy of adhesives, and in improving the cleaning efficacy of hard surface cleaners, such as concrete cleaners. The present invention provides one solution to these needs.

SUMMARY OF THE INVENTION

In one aspect, the present invention relates to a concrete-forming composition comprising:
(a) a base component selected from the group consisting of cement, sand, silica, and combinations thereof,
(b) a carrier selected from the group consisting of water, organic liquids, and combinations thereof, and
(c) a wetting agent, in an amount of between about 0.01% and about 25% by weight based upon the weight of the composition, selected from the group consisting of piperazine-substituted organosulfonates, piperazinone-substituted organosulfonates, and combinations thereof.

In another aspect, the present invention relates to an adhesive or paint composition comprising:
(a) a base polymer selected from the group consisting of acrylic resins, methacrylic resins, alkyd resins, styrene-butadiene resins, latex resins, and combinations thereof,
(b) a wetting/leveling agent selected from the group consisting of piperazine-substituted organosulfonates, piperazinone-substituted organosulfonates, and combinations thereof, and
(c) a surfactant selected from the group consisting of alcohol alkoxylates, organic and inorganic salts of polycarboxylated alcohol alkoxylates, and combinations thereof, wherein the amount of component (a) is between about 20 and about 75 weight percent, the amount of component (b) is between about 0.01 and about 25 (advantageously between about 0.015 and about 10) weight percent, and the amount of component (c) is between about 10 and about 75 weight percent, all weight percents being based upon the total weight of said adhesive or paint composition.

In another aspect, the present invention relates to a cleaning composition comprising:
(a) at least one additive selected from the group consisting of detergents, corrosion inhibitors, organic and aqueous carriers, and combinations thereof,
(b) a wetting/cleaning agent selected from the group consisting of piperazine-substituted organosulfonates, piperazinone-substituted organosulfonates, and combinations thereof, and
(c) a surfactant selected from the group consisting of alcohol alkoxylates, organic and inorganic salts of polycarboxylated alcohol alkoxylates, and combinations thereof, wherein the amount of component (a) is between about 20 and about 95 weight percent, the amount of component (b) is between about 0.01 and about 25 (advantageously between about 0.015 and about 10) weight percent, and the amount of component (c) is between about 10 and about 75 weight percent, all weight percents being based upon the total weight of said cleaning composition.

In yet another aspect, the present invention relates to a method of enhancing the bonding efficacy to a porous substrate of an adhesive or paint composition comprising a polymer or polymerizable monomer which comprises admixing with said composition, prior to curing said composition on said substrate, a bonding-enhancing effective amount (preferably between about 0.001% and about 20%, based upon the weight of the composition) of a surfactant selected from the group consisting of piperazine-substituted organosulfonates, piperazinone-substituted organosulfonates, and combinations thereof.

In still another aspect, the present invention relates to a method for cleaning a porous surface (such as asphalt or concrete) which comprises contacting the porous surface with a cleaning-effective amount (preferably between about 0.001% and about 20%, based upon the weight of the composition) of a surfactant selected from the group consisting of piperazine-substituted organosulfonates, piperazinone-substituted organosulfonates, and combinations thereof.

These and other aspects will become apparent upon reading the following detailed description of the invention.

DETAILED DESCRIPTION OF THE INVENTION

It has now been surprisingly found in accordance with the present invention that the use of a surfactant selected from the group consisting of piperazine-substituted organosulfonates, piperazinone-substituted organosulfonates, and combinations thereof, in accordance with the present invention enhances the cleaning efficacy of hard surface cleaning compositions (such as metal and concrete cleaning compositions), and also enhances the adhesion efficacy, onto porous substrates, of adhesive compositions into which this surfactant is incorporated. Without wishing to be bound by any particular theory, it is believed that this cleaning and adhesion-promoting efficacy is attributable, at least in part, to the low surface tension and interfacial tension associated with these surfactants, which, in turn, imparts good wetting characteristics to the adhesive- or cleaning-composition containing the surfactant.

In another surprising aspect of the present invention, the use of the above-described surfactant in a concrete-forming formulation advantageously reduces the amount of voids in the subsequently-formed concrete, thereby facilitating the production of denser, stronger concrete. Conversely, the concrete forming formulation can be suitably processed in a manner to provide a decreased density with uniform small-sized voids, if desired by the incorporation of a specific surfactant such as that commercially available as POLY-TERGENT SL-62 surfactant, if desired.

The piperazine-substituted and piperazinone-substituted organosulfonate surfactant/wetting agents employed in the present invention have a low interfacial tension and a low critical micelle concentration ("CMC"). These surfactants are suitable for use in a variety of applications, including, for example, in the cleaning of porous and hard surfaces, including, but not limited to, concrete, asphalt, masonry, porous ceramic, wood and wood-like materials, composite woods such as ply-wood and compressed board, stone such as brownstone and redstone, plaster, combinations thereof, and the like. These surfactants are also useful as a concrete emulsion mix additive in order to disperse dyes or increase or decrease the density of a concrete-forming composition, as discussed above.

The piperazine-substituted organosulfonate useful in the present invention is suitably produced by reacting, for example, an aralkyl ether sulfonic acid with a piperazine compound. Likewise, the piperazinone-substituted organosulfonate useful in the present invention is suitably prepared by reacting an aralkyl ether sulfonic acid with a piperazinone compound. Particularly advantageous aralkyl ether sulfonates are those selected from the group consisting of alkylated diphenyl oxide sulfonates having at least one alkyl-substitution on a phenyl ring and wherein said alkyl-substitution is selected from the group consisting of linear, branched, and cyclic alkyl substitutions, and combinations thereof. Although any piperazine compound can be used, preferred compounds include those selected from the group consisting of 1,2-aminoethyl piperazine, 1,4-piperazinediethane sulfonic acid, anhydrous piperazine, hydrated piperazine, and combinations thereof. Illustrative piperazinone compounds are the 2-piperazinones, such as 4-(2-aminoethyl)-2-piperazinone, 4-(2-hydroxyethyl)-2-piperazinone, and N,N-dimethyl-2-piperazinone, and combinations thereof.

Particularly advantageous for use in preparing the piperazine-substituted organosulfonates and piperazinone-substituted organosulfonates useful in the present invention are the alkylated diphenyl oxide sulfonate anionic surfactants corresponding to the following formula or to a mixture of compounds corresponding to the following formula:
wherein each R is independently a saturated alkyl or substituted saturated alkyl radical or an unsaturated alkyl or substituted unsaturated alkyl radical each m and n is independently 0, 1 or 2; each M is independently hydrogen, an alkali metal, an alkaline earth metal, or ammonium or substituted ammonium; and each x and y are individually 0 or 1. Preferably, each R group is independently an alkyl group having from about 8 to about 24 carbon atoms, even more preferably about 10 to about 20 carbon atoms, and most preferably about 12 to about 16 carbon atoms, with 16 carbon atoms being especially preferred. The alkyl groups can be linear, branched or cyclic, with linear or branched radicals being preferred. The M+ ammonium ion radicals are of the formula $(R')_3NH+$ wherein each R' is independently hydrogen, a $C_1$–$C_4$ alkyl or a $C_1$–$C_4$ hydroxyalkyl radical. Illustrative $C_1$–$C_4$ alkyl or hydroxyalkyl radicals include methyl, ethyl, propyl, isopropyl, butyl, hydroxymethyl and hydroxyethyl. Typical ammonium ion radicals include ammonium ($N+H_4$), methylammonium ($CH_3N+H_3$), ethylammonium ($C_2H_5N+H_3$), dimethylammonium ($(CH_3)_2N+H_2$), methylethylammonium ($CH_3N+H_2C_2H_5$, trimethylammonium ($(CH_3)_3N+H$) dimethylbutylammonium ($(CH_3)_2N+HC_4H_9$ hydroxyethylammonium ($HOCH_2CH_2N+H_3$) and methylhydroxyethylammonium ($CH_3N+H_2CH_2CH_2OH$). Preferably, each M is hydrogen, sodium, calcium, potassium or ammonium.

Alkylated diphenyl oxide sulfonates and their methods of preparation are well-known and reference is made thereto for the purposes of this invention. Representative methods of preparation of sulfonates are disclosed in U.S. Pat. Nos. 3,264,242; 3,634,272; and 3,945,437. Commercial methods of preparation of the alkylated diphenyl oxide sulfonates generally do not produce species which are exclusively monoalkylated, monosulfonated, dialkylated or disulfonated. The commercial available species are predominantly (greater than 90 percent) disulfonated and are a mixture of mono- and dialkylated with the percentage of dialkylation being about 15 to about 25 and the percentage of monoalkylation being about 75 to 85 percent. Most typically, the commercially available species are about 80 percent monoalkylated and 20 percent dialkylated.

Two illustrative commercially available solutions containing alkylated diphenyl oxide sulfonate surfactants are DOWFAX® 8390 and DOWFAX® 8390A surfactants, trademarked products of The Dow Chemical Company. In each, the alkyl group R is predominantly a hexadecyl ($C_{16}$) group. DOWFAX® 8390A typically contains about 25 percent of the acid forms of the surfactant, that is, in which M is hydrogen. DOWFAX® 8390 surfactant typically contains about 35 percent of the sodium salts of the surfactant, that is, in which M is sodium. DOWFAX® 8390A solution fully or partially neutralized with ammonium hydroxide is also suitable for use in the present invention.

The alkylated diphenyl oxide sulfonate compound is suitably reacted with the piperazine compound to produce the desired piperazine salt using a molar ratio of sulfonate compound to piperazine compound of between about 10:1 and about 1:10, preferably between about 2:1 and about 1:2.

The organic or inorganic salt of a polycarboxylated alcohol alkoxylate is preferably selected from the group consisting of organic or inorganic salts of the following: polycarboxylated linear alcohol alkoxylates, polycarboxylated branched alcohol alkoxylates, polycarboxylated cyclic alcohol alkoxylates, and combinations thereof. Suitable polycarboxylated alcohol alkoxylates are shown by the empirical structural formula:

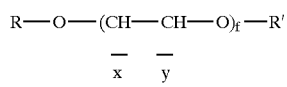

wherein R is a hydrocarbon radical having between about 6 and about 18 carbon atoms, R' is hydrogen or a hydrocarbon between 1 and 8 carbon atoms, x and y are independently selected from the group consisting of hydrogen, methyl, and succinic acid radicals, with the proviso that at least one x or y per molecule is a succinic acid radical, and f is between 1 and 25. Preferred polycarboxylated alcohol alkoxylates are those having a backbone containing both poly(propylene oxide) and poly(ethylene oxide) blocks, and such preferred polycarboxylated alcohol alkoxylates are readily commercially available, for example, under the registered trademark POLY-TERGENT CS-1 surfactant, a product of Olin Corporation. Any of a wide variety of inorganic or organic bases can be utilized to neutralize at least a portion of the acid groups on the polycarboxylated alcohol alkoxylate to provide the desired salt thereof, such as for example alkali metal hydroxides, alkaline earth metal hydroxides, and metal-free hydroxides, including potassium hydroxide, ammonium hydroxide, calcium hydroxide, magnesium hydroxide, ammonia, mono-, di- and tri-ethanol amines, and combinations thereof. Sodium hydroxide is preferred, and although potassium hydroxide can be employed, it is not preferred. The organic or inorganic base is preferably employed in at least an equimolar amount relative to the number of moles of polycarboxylated alcohol alkoxylate used. The polycarboxylated alcohol may also contain a polycarboxylic acid, for example, polyacrylic acid, along with the starting alcohol alkoxylate and esters of the alkoxylate and the said polycarboxylic acid.

The alcohol alkoxylate employed in the present invention is suitably selected from a wide range of such compounds, as disclosed, for example, in U.S. Pat. No. 3,956,401. Illustrative linear alcohol alkoxylates are shown by the formula:

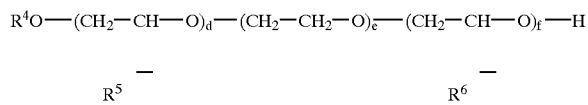

wherein
$R^4$ is a linear, alkyl hydrocarbon having, for example, an average of from about 7 to about 10 carbon atoms, $R^5$ is a linear, alkyl hydrocarbon of about 1 to about 4 carbon atoms, $R^6$ is a linear, alkyl hydrocarbon of about 1 to about 4 carbon atoms, d is an integer of about 1 to about 6, e is an integer of about 4 to about 15, and f is an integer of about 4 to about 25.

Useful linear alcohol alkoxylates are commercially available, for example, under the registered trademark POLY-TERGENT SL-42, a product of Olin Corporation. If desired, the alcohol alkoxylate is suitably end-capped with a lower alkyl group, and such a product is commercially available as POLY-TERGENT SLF-18, a propylene oxide capped linear alcohol alkoxylate that is also a product of Olin Corporation, and these end-capped linear alcohol alkoxylates have been found by the present inventors to provide desirably low foaming during use. Also advantageous for use in accordance with the present invention is a surfactant within the group commercially available as POLY-TERGENT SLF-18B series surfactants, which are surfactants characterized by enhanced biodegradability and are also products of Olin Corporation, which are alkene oxide capped linear alcohol alkoxylates, containing ethylene oxide moieties in the backbone, and suitably also containing at least one propylene oxide moiety in the backbone, as disclosed, for example, in U.S. Pat. Nos. 4,925,587 and 4,898,621. Use of the POLY-TERGENT SLF-18 and/or POLY-TERGENT SLF-18B surfactants to comprise component (c) in accordance with the present invention has been by the present inventors to avoid the need for an antifoaming agent in the concentrates and working compositions of the present invention.

Nonionic surfactants optionally employed in the compositions and methods of the present invention include those commercially available, such as, for example, Tergitol XL-80N surfactant, a trademarked product of Union Carbide Chemicals and Plastics Technology Corp., Danbury, Conn. Tergitol XL-80N is a mixture of $C_8$–$C_{10}$ ethoxylated and propoxylated primary alcohols having an average molecular weight of approximately 420. The mixture decomposes rather than boils upon heating, and has a flash point of 425° F. (Cleveland open cup ASTM D 92.218 C). It has a freezing point of −3° C., a specific gravity of 0.98 at 20° C. and is a cloudy liquid which is fully soluble in water.

Another useful nonionic surfactant is NEODOL® 91-6 surfactant, a trademarked surfactant product of Shell Chemical Company, Geismar, La. NEODOL® 91-6 surfactant is a detergent range mixture of $C_9$–$C_{11}$ linear primary alcohol ethoxylates having an average of 6 moles of ethylene oxide per mole of alcohol. NEODOL® 91-6 is a slightly viscous liquid having a pour point of 45° F. and a melting point of 42°–48° F. Its solubility in water is complete, although at high concentrations the product may form a gel with water. NEODOL® 91-6 surfactant contains less than 6 parts per million ethylene oxide. NEODOL® 91-6 surfactant possesses a hydroxyl number of 126–140 milligrams potassium hydroxide per gram.

While these surfactants are suitable for use in the present invention, others within a wide range of molecular weights can also be successfully employed in aqueous or organic solvent solution. For example, surfactants with linear $C_9$–$C_{11}$ carbon chains and five or six EO or PO groups are expected to provide desirable results.

An antifoaming agent (also referred to herein as a "defoaming agent" or "defoamer") is optionally employed in accordance with the process of the present invention. The degree of foaming encountered depends to a large extent upon the specific compounds selected for components (a), (b) and (c), as well as upon the physical method employed for cleaning a surface or providing adhesion to a substrate, as desired. Illustrative defoamers include silicon oils, mineral oils, modified alcohol ethoxylate, EO/PO block copolymers, phosphate ester, hydrophobic silica, and Fatty alcohols as well as blends of these defoamers. The antifoaming agent should be selected and employed at a concentration such that the detergency of the surfactant(s) and the corrosion inhibition of the 2-piperazinone are not unduly reduced. The antifoaming agent is desirably employed in the formulation at a concentration of 0.01 to 2 percent by weight, preferably at about 0.02 percent by weight. Other useful antifoaming agents include liquid silicone emulsions manufactured and sold by Dow Corning Corporation (Midland, Mich.) under its trademarks "DOW CORNING® X2-1410 ANTIFOAM" and "DOW CORNING® X2-2210 ANTIFOAM".

The reaction conditions employed in fabricating the compositions and methods of the present invention are not narrowly limited to any particular conditions. It is preferred to carry out the reaction steps to form the compositions at a temperature of between about 25° C. and about 150° C., although a higher or lower temperature is suitably employed if desired. Reaction pressure can be selected as desired. Typically, super- or sub-atmospheric reaction pressure is not necessary for the reactions employed in the processes of the present invention. Atmospheric pressure is preferred in order to avoid the expense of special reaction vessels. However, elevated pressures can be used, if desired, and these super-atmospheric pressures of up to 10 atmospheres or higher are suitably utilized if desired.

The following examples are intended to illustrate, but in no way limit the scope of, the present invention.

EXAMPLE 1

Concrete Cleaning Example

Part A—Preparation of Surfactant A

A premier Caframo (high intensity mixer) at torque of 500 to 1,000 rpm was used to blend a premix of 40 grams of Poly-Tergent(R) 2A1 acid (Alkyl diphenylether disulfonate), 3.91 grams of water and 8.04 grams of 1 (2, Aminoethyl)piperazine to neutralize 2A1 acid to a pH of 6, until it was totally homogeneous. The blend is 77 percent active.

A premier Caframo (high intensity mixer) at torque of 500 to 2,000 rpm was used to mix 7.136 grams of CS-1 acid (polycarboxylated linear alcohol alkoxylate) with 21.407 grams Poly-Tergent(R) SL 18 (linear alcohol alkoxylate) until it was in solution. 40 grams of above 77 percent active component and 7.196 grams of defoamer were added to this mixture, and mixed until it was totally homogeneous. Following homogenizing, 2.106 grams of 50% NaOH were added to neutralize the CS-1 acid and mixed for 20 minutes. The resulting surfactant product showed low foaming at room temperature and at an elevated temperature of 120° F. This surfactant product is identified as Surfactant A in Examples 1–9 hereof.

Part B—Preparation of Concrete Cleaning Formulation

A concrete cleaning formulation was prepared by mixing the following components:

| Component: | Amount: |
|---|---|
| Diethanolamine | 25 grams |
| NaOH (50%) | 46 grams |
| Na2SiO3 | 26 grams |
| Potassium Carbonate | 11 grams |
| Poly-Tergent @ SL-42* | 1 grams |
| Ethylene Glycol | 14 grams |
| Water | 877 grams |
| Surfactant A | 7 grams |

*This substituted polycarboxylated alcohol is commercially available.

Part C—Concrete/Asphalt Cleaning

The above cleaning formulation was evaluated for efficacy in cleaning asphalt and concrete. Cleaning properties measurements were made using ASTM D 4258 Test Method D425883 (Reapproved 1992) in order to measure the surface cleaning of concrete by the cleaning formulation in removing grease, dirt, and loose material prior to the application of coatings. Procedures employed in this test regimen include broom cleaning, vacuum cleaning, air blast cleaning, water cleaning, detergent water cleaning, and steam cleaning. This test regimen and the associated cleaning methodology are not intended to alter the surface profile of the concrete but to test the cleaning of the concrete surface.

The above-described concrete cleaning formulation was evaluated for cleaning efficacy using modified ASTM D 4258 Test Method D4258-83 (Reapproved 1992). Briefly this modified test procedure involves following: 1) Prepare the cleaning solution according to the above formulation. 2) Pour 5 drop of above surfactant on the oil or grease surface and wait 20 to 30 minute let it penetration and dry. 3) Cleaning the surface with a stiff-bristle in order to remove heavy deposits of grease or oil. 4) Flush surface thoroughly with clean potable water and removed all residues of the cleaning gent. 5) Repeat flushing until the pH of the water meets the acceptance criteria of Test Method D4262-83 (Reapproved 1988) cleaning cycle. When tested in accordance with this protocol, the above-described cleaning formulation provided excellent concrete cleaning results.

EXAMPLE 2-6

Additional Concrete Cleaning Examples

Following the procedure given in Example 1 above, additional cleaning formulations (identified as Examples 2 through 6 below) were prepared and tested using the test regimen described in Example 1. Each of these formulations provided excellent concrete cleaning performance results in those tests.

Example 2 - CONCRETE CLEANING FORMULATION

| | |
|---|---|
| EDTA, (K salt) Dihydrate | 30 grams |
| NaOH (50%) | 10 grams |
| Na2SiO3 5H2O | 60 grams |
| Poly-Tergent ® SL-42* | 20 grams |
| Water | 873 grams |
| Surfactant A | 7 grams |

Example 3 - CONCRETE CLEANING FORMULATION

| | |
|---|---|
| EDTA, (K salt) Dihydrate | 30 grams |
| NaOH (50%) | 10 grams |
| Na2SiO3 5H2O | 60 grams |
| NONYL PHENOL | 20 grams |
| Water | 873 grams |
| Surfactant A | 7 grams |

Example 4 - CONCRETE CLEANING FORMULATION

| | |
|---|---|
| EDTA, (K salt) Dihydrate | 30 grams |
| NaOH (50%) | 10 grams |
| Na2SiO3 5H2O | 60 grams |
| Surfactant A | 20 grams |
| Water | 880 grams |

Example 5 - CONCRETE CLEANING FORMULATION

| | |
|---|---|
| Na2SiO3.5H2O | 30 grams |
| Alcohol AlkoxylatePhosphateester | 20 grams |
| Tridecyl Alcohol Ethoyxlates | 25 grams |
| Ethlene Glycol butyl ether | 65 grams |
| Sodium tripolyphosphate | 30 grams |
| Water | 830 grams |
| Surfactant A | 7 grams |

Example 6 - DRY CONCRETE CLEANING FORMULATION

| | |
|---|---|
| Na2SiO3 | 20% |
| Light soda ash | 37% |
| NAOH Beads | 25% |
| Sodium tripolyphosphate | 15% |
| Surfactant A | 3% |

Note that the dry formulation of Example 6 was tested in the protocol of Example 1 after pre-wetting the concrete test sample to be cleaned, and then sprinkling the powderized dry cleaning formulation onto the concrete.

Example 7 - Metal Cleaning - Light Duty Formulation

The following formulation was prepared and tested for cleaning hardened grease and/or oil from a metal surface on metal test panels.

| Formulation | % by wt. of Component |
|---|---|
| Na2SiO3 (Anhydrous) | 3% |
| Ethylene Glycol butyl ether | 1% |

-continued

| | |
|---|---|
| Tetrapotassium Pyrophosphate | 3% |
| Water | 90% |
| Surfactant A | 3% |

Example 8 - Metal Cleaning - Heavy Duty Formulation

The following formulation was prepared and tested for cleaning hardened grease and/or oil from a metal surface on metal test panels.

| Dry Formulation | % by wt. of Component |
|---|---|
| Na2SiO3 | 36% |
| Soda ash | 26% |
| NAOH Beads | 15% |
| TetraSodium pyrophosphate | 20% |
| Surfactant A | 3% |

The formulations of Examples 7 and 8 above were both found to be effective in emulsifying grease and/or oil on the metal test panels, thereby rendering the grease and/or oil easy to remove from the test panels.

EXAMPLE 9
Hard Surface Cleaning (Tile)
Part A—TEST PROCEDURE

A modified version of the CSMA's newly approved Method for Applying and Measuring the Removal of Lime Soap was used to determine detergency, and the procedure used was as follows: A multi-component soil consisting of bar soap, shampoo, clay, body oils, and hardness ions was prepared, dried and pulverized. The parent soil was suspended in a diluent and sprayed onto standard black ceramic tiles using an air brush. The soil was heated onto the tiles to make it tenacious. A wet sponge sprayed with a cleaning formulation and a Gardner Abrasion Tester were used to simulate soil removal. Detergency was calculated from spectrocolorimeter readings.

A few changes were made to this procedure for better differentiation and reproducibility:

1) 0.20–0.25 grams of soil were applied per tile instead of 0.10–0.15 grams.
2) The soil was heated on the tile for four minutes rather than two minutes.
3) Approximately 0.5 grams of test product was sprayed onto the sponge rather than directly onto the soiled area of the tile.

The rest of the procedure was followed as written.

| % Area Cleaned | % Surfactant Used | Surf. Type |
|---|---|---|
| 37.526 | 4% | Surfactant A |
| 24.1457 | 4% | Surfactant A |
| 52.3813 | 1% | Surfactant A |
| 53.2372 | 1% | Surfactant A |
| 3.3834 | 100% | WATER only |
| −16.5575 | 100% | WATER only |
| 0.9835 | 100% | WATER only |
| 23.1374 | 100% | Comparison 1 |
| 21.08438 | 100% | Comparison 1 |
| 30.18845 | 100% | Comparison 2 |
| 34.44544 | 100% | Comparison 2 |
| 54.18409 | 100% | Comparison 3 |
| 34.65991 | 100% | Comparison 3 |

Comparison 1 Formulation

| | |
|---|---|
| Poly-Tergent ® CS-1 | 5% |
| Poly-Tergent ® SL-62 | 10% |
| Preservative, Dye, Fragrance | QS* |
| Water | to 100% |

Comparison 2 Formulation

| | |
|---|---|
| Poly-Tergent ® CS-1 | 5% |
| Poly-Tergent ® SL-62 | 12.5% |
| Preservative, Dye, Fragrance | QS* |
| Water | to 100% |

Comparison 3 Formulation

| | |
|---|---|
| Isopropyl Alcohol | 12% |
| Poly-Solv ® DPM | 4% |
| Poly-Tergent ® 3B2 | .15% |
| Poly-Tergent ® CS-1 | .15% |
| Acetic Acid | to pH 4.5 |
| Preservative, Dye, Fragrance | QS* |
| Water | to 100% |

The above results show that Surfactant A provides excellent cleaning efficacy in cleaning tile, as compared to water or the comparison conventional surfactants identified above as Comparisons 1–3.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims.

What is claimed is:

1. A method for cleaning a porous concrete surface which comprises contacting the porous concrete surface with a cleaning-effective amount of a cleaning composition consisting essentially of:

(a) at least one additive selected from the group consisting of water, corrosion inhibitors, and combinations thereof, (b) a wetting/cleaning agent selected from the group consisting of piperazine-substituted organosulfonates, piperazinone-substituted organosulfonates, and combinations thereof, and (c) a surfactant selected from the group consisting of alcohol alkoxylates, organic and inorganic salts of polycarboxylated alcohol alkoxylates, and combinations thereof, wherein the amount of component (a) is between about 20 and about 95 weight percent, the amount of component (b) is between about 0.01 and about 25 weight percent, and the amount of component (c) is between about 10 and about 75 weight percent, all weight percents being based upon the total weight of said cleaning composition.

2. A method of claim 1 wherein component (b) is present in an amount of between about 0.015 and about 10 weight percent based upon the total weight of the composition, and wherein component (b) additionally comprises a nonylphenol surfactant in an amount of between zero and about 20 percent based upon the total weight of the composition, and wherein the piperazine-substituted organosulfonate of component (b) is prepared by reacting a piperazine compound with an aralkyl ether sulfonic acid.

3. The method of claim 1 wherein said polycarboxylated alcohol alkoxylate of component (c) is selected from the group consisting of polycarboxylated linear alcohol alkoxylates, polycarboxylated branched alcohol alkoxylates, polycarboxylated cyclic alcohol alkoxylates, and combinations thereof.

4. The method of claim 1 wherein said cleaning composition consisting essentially of:

(a) at least one additive selected from the group consisting of detergents, corrosion inhibitors, organic and aqueous carriers, and combinations thereof, (b) a wetting/cleaning agent selected from the group consisting of piperazine-substituted organosulfonates, piperazinone-substituted organosulfonates, and combinations thereof, wherein said wetting/cleaning agent additionally comprises a nonylphenol surfactant in an amount of between zero and about 20 percent based upon the total weight of the composition, and wherein the piperazine-substituted organosulfate of component said wetting/cleaning agent is prepared by reacting a piperazine compound with an aralkyl ether sulfonic acid, and (c) a surfactant selected from the group consisting of alcohol alkoxylates, organic and inorganic salts of polycarboxylated alcohol alkoxylates, and combinations thereof, wherein the amount of component (a) is between about 20 and about 95 weight percent, the amount of component (b) is between about 0.015 and about 10 weight percent, and the amount of component (c) is between about 10 and about 75 weight percent, all weight percents being based upon the total weight of said cleaning composition.

* * * * *